(12) United States Patent
Boye et al.

(10) Patent No.: US 12,486,106 B2
(45) Date of Patent: *Dec. 2, 2025

(54) DISPOSABLE PAD FOR INDOOR AND OUTDOOR GARBAGE CANS, RECYCLABLES CANS, COMPOST BINS, AND OTHER CONTAINERS

(71) Applicant: GROTE Industries LLC, Oneida, WI (US)

(72) Inventors: Keith R. Boye, Oneida, WI (US); Jared Miller, Deforest, WI (US); Robert Godfrey, Monona, WI (US)

(73) Assignee: GROTE Industries LLC, Oneida, WI (US)

( * ) Notice: Subject to any disclaimer, the term of this patent is extended or adjusted under 35 U.S.C. 154(b) by 1 day.

This patent is subject to a terminal disclaimer.

(21) Appl. No.: 18/672,186

(22) Filed: May 23, 2024

(65) Prior Publication Data

US 2024/0308757 A1 Sep. 19, 2024

Related U.S. Application Data

(63) Continuation-in-part of application No. 17/496,920, filed on Oct. 8, 2021, now Pat. No. 12,006,139.

(Continued)

(51) Int. Cl.
*B65F 1/06* (2006.01)
*A61L 2/18* (2006.01)
(Continued)

(52) U.S. Cl.
CPC .................... *B65F 1/06* (2013.01);
*A61L 2/18* (2013.01); *B65F 7/00* (2013.01);
*A61L 2202/23* (2013.01);
(Continued)

(58) Field of Classification Search
CPC .... B65F 7/005; B65F 7/00; B65F 1/06; B65F 2001/1489; B65F 2210/1023;
(Continued)

(56) References Cited

U.S. PATENT DOCUMENTS

2008/0179330 A1 7/2008 Brooks et al.
2009/0017710 A1 1/2009 Bugada et al.
(Continued)

FOREIGN PATENT DOCUMENTS

JP 2003000689 1/2003
JP 2004224549 8/2004
(Continued)

*Primary Examiner* — Robert J Hicks
(74) *Attorney, Agent, or Firm* — Wong Meyer Smith & McConnell

(57) ABSTRACT

Systems and methods for sanitizing, cleaning, and deodorizing a container such as a garbage can. The sanitization product can include a disposable pad covered in a solution that is inserted into indoor or outdoor garbage cans. The solution may be configured to minimize and prevent the spread of bacteria and other germs within a garbage can, which routinely occurs due to spilling of food, liquids, and other garbage within the can. Additionally, the pad may be made of an absorbable material so that any liquids that enter a garbage can can immediately be absorbed. Different solutions may be applied to the product depending on where the pad will be used. Additionally, a kit may be provided that includes multiple disposable pads. For instance, the kit may include a dozen pads, or more or less pads, that help to keep the user's garbage can clean and void of unpleasant odors.

20 Claims, 12 Drawing Sheets

Related U.S. Application Data

(60) Provisional application No. 63/089,803, filed on Oct. 9, 2020.

(51) Int. Cl.
  B65F 7/00 (2006.01)
  B65F 1/14 (2006.01)

(52) U.S. Cl.
  CPC .............. *B65F 2001/1489* (2013.01); *B65F 2210/1023* (2013.01); *B65F 2210/129* (2013.01)

(58) Field of Classification Search
  CPC ...... B65F 2210/129; A01P 1/00; A01N 25/10; A01N 25/08; A01N 25/34; A61L 2/18; A61L 2/16; A61L 2/26; A61L 9/012; A61L 9/01; Y10S 220/9082; Y10S 220/9081; Y10S 220/908
  USPC ............ 220/87.1, 908.2, 908.1, 908, 495.11, 220/495.08, 495.06; 422/1
  See application file for complete search history.

(56) References Cited

U.S. PATENT DOCUMENTS

| | | | | |
|---|---|---|---|---|
| 2021/0156080 | A1* | 5/2021 | Lau | ................. D06M 15/59 |
| 2021/0395652 | A1* | 12/2021 | Smyth | ................. A01N 25/08 |

FOREIGN PATENT DOCUMENTS

| | | |
|---|---|---|
| JP | 2004224550 | 8/2004 |
| JP | 2006103821 | 4/2006 |
| JP | 2014511320 | 5/2014 |
| JP | 2020033175 | 3/2020 |

* cited by examiner the bag and land directly into the bottom of the can. Additionally, garbage bags routinely break due to sharp ends of products deposited therein, overly loading the garbage bag, or uncareful removal of the bag from the can. When residue ends up in the bottom of the can, it oftentimes goes unnoticed. Other times, the residue is detected, but not immediately cleaned because it is unpleasant, inconvenient, and time consuming. This can cause bacteria to grow, germs and viruses to spread, and odors to permeate in and around the garbage can. Other times, the can is cleaned by a user with strong chemicals, which results in undesirable direct exposure to the user. Many of the same issues are present with outdoor garbage cans. For instance, even when a garbage bag from an indoor can breaks, users nevertheless throw the broken bag directly into the outdoor garbage can, causing the contents of the bag to fall out of the bag and into the bottom of the outdoor can. Similarly, animals smelling food or other waste products can rip open bags causing the contents to fall out. Additionally, certain waste materials are exclusively deposited into an outdoor can, including pet waste and other chemical materials. This causes the smell associated with outdoor garbage cans to usually be even worse than indoor garbage cans. Further still, depending on the climate, outdoor cans may be exposed to excessive heat, and sometimes extended exposure to direct sunlight. This can exaggerate the undesirable smell and bacteria and germ growth and spread of viruses. In addition to the displeasure associated with smelly and gross garbage cans, there is concern for growth of bacteria

DISPOSABLE PAD FOR INDOOR AND OUTDOOR GARBAGE CANS, RECYCLABLES CANS, COMPOST BINS, AND OTHER CONTAINERS

CROSS-REFERENCE(S) TO RELATED APPLICATION(S)

This present application is a continuation-in-part application claiming priority to U.S. Non-Provisional patent application Ser. No. 17/496,920 filed on Oct. 8, 2021 and entitled Disposable Pad for Indoor and Outdoor Garbage Cans, which claims priority on U.S. Provisional Patent Application Ser. No. 63/089,803, filed on Oct. 9, 2020 and entitled Disposable Pad for Indoor and Outdoor Garbage Cans, the entire contents of which are hereby expressly incorporated by reference into the present application.

BACKGROUND OF THE INVENTION

1. Field of the Invention

The invention relates generally to indoor and outdoor garbage cans, as well as recyclable cans and compost bins or containers, and, in particular, to a disposable pad or other piece of material that can be inserted into the garbage can, recyclable cans, or compost bins to improve sanitization, reduce bacteria and germ growth, kill certain viruses, reduce odor, and absorb liquids in indoor and outdoor garbage cans, recyclable cans, and compost bins or containers.

2. Discussion of the Related Art

Despite best efforts to keep areas in and around garbage or trash cans clean, they inevitably get dirty. Oftentimes, trash bags associated with indoor garbage cans can repeatedly get dislodged from the can, which can cause food, beverages, and other waste to miss and other microorganisms that can be dangerous for humans and animals living in close proximity to the garbage can.

Many of the same issues can be present with cans configured to receive recyclable materials. In fact, in certain areas, local rules prohibit depositing recyclable materials into a garbage bag, such that the recyclable materials are deposited directly into the recyclable can itself. Many recyclable materials contain liquids, making it likely that at least some liquids will enter the bottom of the recyclable can. Similar issues also can be present for compost bins or containers that are used to collect materials within a home, after which the compostable material is deposited into an outdoor compost bin. Compostable materials can include a variety of food and other products that have adverse odors, liquids, residue, and the like that can remain in the container after the materials have been deposited into the outdoor compost bin.

Additionally, there are significant variations in terms of the sizes and shapes of garbage cans. Different garbage bags may be required depending on the size and shape of the garbage can.

What is therefore needed is a disposable pad or other piece of material that can be deposited within an indoor or outdoor garbage or trash can, recyclable can, compost bin, or other container. What is further needed is a disposable pad or other piece of material that is configured to kill germs and sanitize an indoor or outdoor garbage can, recyclable can, compost bin, or other container. What is further needed is a pad or other piece of material that is configured to prevent growth of bacteria, germs, odor, spread of germs, and other undesirable contents within an indoor or outdoor garbage can, recyclable can, compost bin, or other container. What is further needed is a pad or piece of material that has superior absorbable qualities in order to absorb any liquids or moisture contained within a garbage can, recyclable can, compost bin, or other container. What is further needed is a pad or piece of material that can be used with garbage cans, recyclable can, compost bin, or other container of differing sizes and shapes.

SUMMARY AND OBJECTS OF THE INVENTION

By way of summary, the present invention is directed to a sanitization product for a container, such as a garbage can, a recyclable can, a compost bin, and the like, that includes a disposable pad configured to be deposited into a base of the garbage can and a solution applied to the disposable pad to improve the characteristics of the interior of the garbage can. The solution may be configured to serve a number of purposes, including killing bacteria and germs within the garbage can, preventing exposure to microorganisms and spread of viruses, minimizing odor, and absorbing moisture or liquids. For instance, the solution may be a broad spectrum disinfectant, cleaner, virucidal, and deodorizer. The pad may be made of card stock, paper, cardboard, or foam material. Alternatively still, the pad can be made of a meltblown fabric. In other embodiments, the pad may be made of a recyclable material or a compostable material. Additionally, the pad may comprise a deodorizer and it may also be scented to help minimize adverse smells.

According to another aspect of the present invention, a first disposable pad having a first solution is configured for use with an indoor garbage can, and a second disposable pad has a second solution that is configured for use with an outdoor garbage can. The first disposable pad may have a first area, whereas the second disposable pad may have a second area. The second area may be greater than the first area. Further still, the first disposable pad may be dimensioned to provide a protective liner for the bottom of the indoor garbage can. Additionally, the second disposable pad may be dimensioned to provide a protective liner for the bottom of the outdoor garbage can.

According to another aspect of the invention, a method of using a sanitization product for a container is provided. The method may include the steps of inserting a disposable pad into a bottom of the container, inserting one or more of garbage, recyclable materials, and compostable materials into the container, and disposing of the one or more of garbage, recyclable materials, and compostable materials and the disposable pad. The method may also include the steps of attaching a first garbage bag to an indoor garbage can where the pad is located beneath, removing the first garbage bag once the first garbage bag is full, attaching at least one additional garbage bag to the indoor garbage can when the pad is located beneath, and disposing of the at least one additional garbage bag and the disposable pad. Additionally, the method may include the step of providing a plurality of disposable pads. Further still, the method may include the step of cutting the disposable pad to a desired size. While the pads shown in the current figures are shown to be generally rectangular in shape, the pads could come in any number of shapes, including those that mimic the shape of the bottom of the garbage can. Similarly, while a single sized pad is shown, pads could come in any number of different dimensions based on the shape of the garbage can and the desires of the user.

Additionally, the method may include the step of moving a plurality of fringes formed in an outer edge of the disposable pad in an upward direction while the disposable pad is inserted into the container. Further, an outer perimeter may be formed by the plurality of fringes when the disposable pad is inserted into the container. This outer perimeter may abut a side of the container. Additionally, the outer perimeter may contain liquids from the container within the outer perimeter. The method may also include the step of locating a backing attached to the disposable pad adjacent to the bottom of the container, where the backing provides structural rigidity to the disposable pad. The backing may also have a footprint that is compatible with the footprint of the container.

According to yet another aspect of the invention, a sanitization kit is provided for at least one garbage bag. The kit may include a sanitization solution configured to reduce bacteria and odor and spread of viruses and a first plurality of disposable pads coated in the sanitization solution. The first plurality of disposable pads may be placed within the garbage can or container. The first plurality of disposable pads may comprise fifty-two disposable pads, although smaller or larger packs of pads could similarly be provided. The kit may also provide a second plurality of disposable pads. Further still, the first plurality of disposable pads may have a first footprint configured for insertion into an indoor garbage can or other container and the second plurality of disposable pads has a second footprint configured for insertion into an outdoor garbage can or other container.

According to another aspect of the present invention, the disposable pad may include a main pad body having an outer edge, a plurality of slits extending inwardly from the outer edge, and a plurality of fringes formed between adjacent slits. The plurality of fringes may overlap to form an outer perimeter when the disposable pad is inserted into the interior of the container. This outer perimeter may provide a protective liner for the bottom of the container. Additionally, the plurality of slits may be formed substantially equidistantly around the outer edge. Further still, a first plurality of slits may extend substantially the same first distance inwardly from a first portion of the outer edge, whereas a second plurality of slits may extend substantially the same second distance inwardly from a second portion of the outer edge, where the first distance is greater than the second distance.

According to yet another aspect of the present invention, a rigid or semi-rigid backing material may be affixed to the disposable pad. The rigid or semi-rigid backing material may also include one or more folds configured to enable the backing material to conform to a bottom or side surface of the container.

These, and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
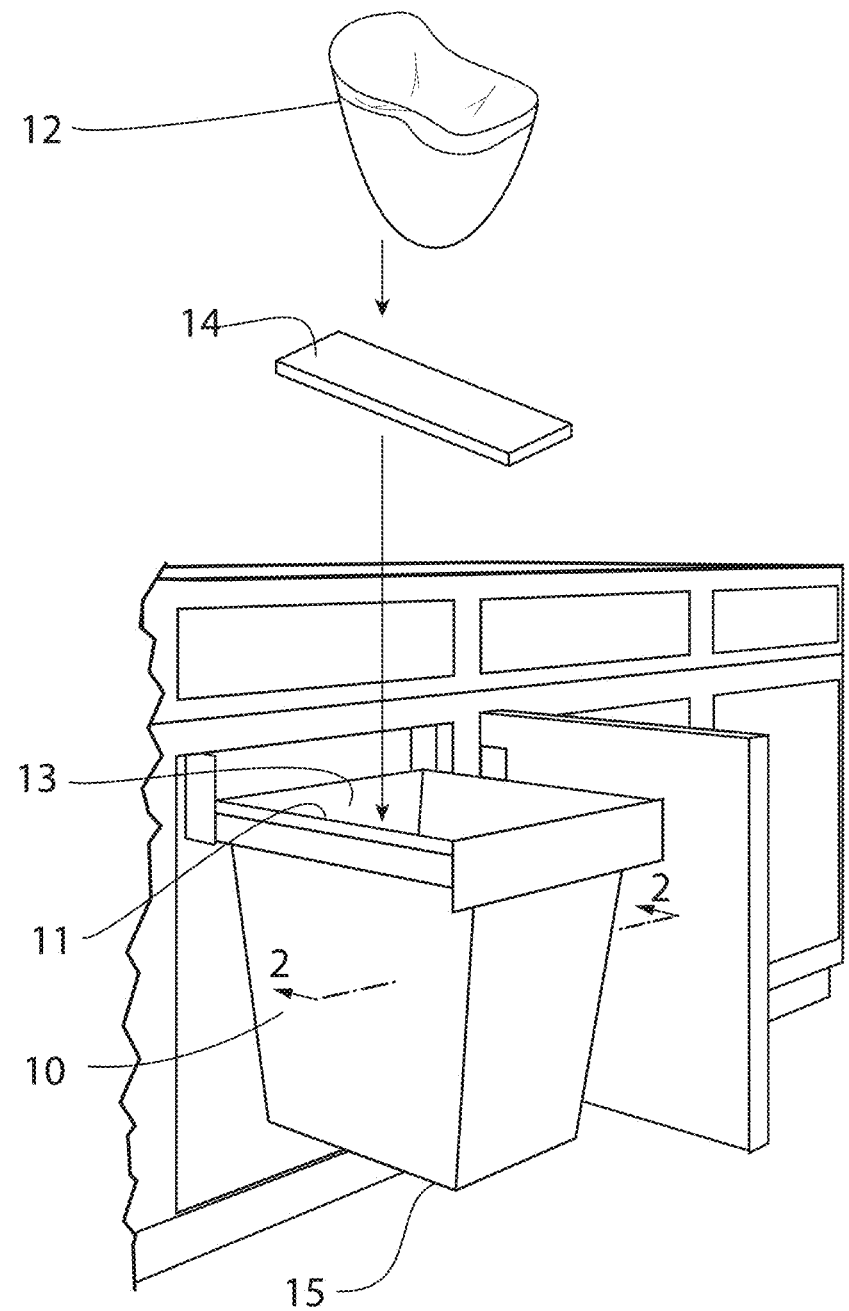
FIG. 1 illustrates an indoor garbage can with an inventive disposable pad.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected, attached, or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

The present invention is directed to a variety of different disposable pads or other materials that can be deposited into a garbage or trash can, recyclable can, compost bin, or other container (referred to collectively as garbage cans) in order to improve the conditions of the interior of the garbage can. For instance, the pad or other material can serve one of many functions, including, minimizing growth and spread of bacteria, viruses, and germs, minimizing odors associated with the interior of the garbage can, improving the sanitization conditions of the interior of the garbage can, reducing exposure of microorganisms, absorbing liquids and moisture contained within the interior of the garbage can, and the like. The pad may be designed to feature qualities optimized for absorbing water-based liquids, optimized for oil-based liquids, or optimized for absorbing both water-based and oil-based liquids. The pad can also function to improve the conditions of the interior of the garbage can in any other desirable way. In practice, the pad or other material can be disposed of on a regular basis, for instance, on a weekly basis when garbage is collected. Of course, pads could be kept for multiple weeks depending on the needs of a given user, especially for an indoor garbage can that may get less dirty than and outdoor garbage can. As such, the pads help keep the interior of the garbage can clean.

Figure 2:
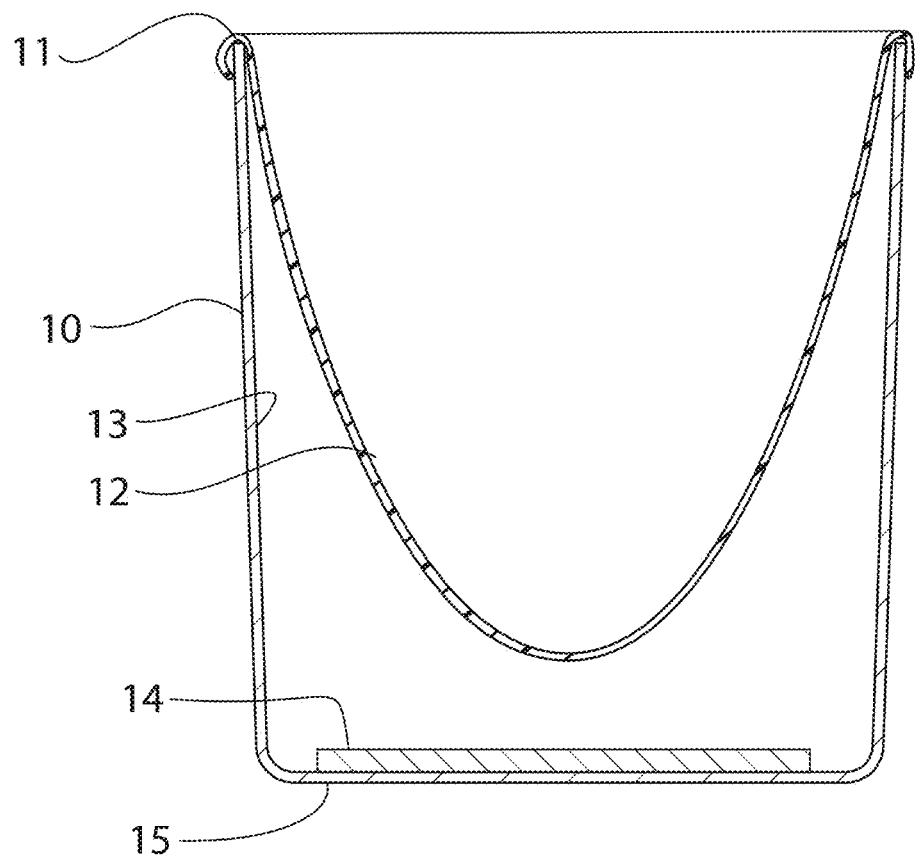
FIG. 2 illustrates a cross sectional view of an indoor garbage can with an inventive disposable pad.

Different pads or other materials can be used depending on whether the pad is designed for use with an indoor garbage can, an outdoor garbage can, a recyclable can, a compost bin, or another container. As known to those having ordinary skill in the art, many indoor garbage cans 10 are smaller in size, and typically have a bag 12 that is installed to the perimeter 11 of the opening of the can as shown in FIG. 1. Thus, for indoor garbage cans 10, the pad 14 or other material would be inserted into the interior 13 of the can 10 so it rests upon the bottom or base 15, after which bags 12 may be installed to the can 10. The pad 14 or other material may be dimensioned to securely fit within the bottom of the indoor garbage can 10 without significantly compromising the volume of garbage that can be received within the bag 12, as best seen in FIG. 2. Typically, indoor cans designed for containing recyclable materials has the same general layout and footprint as an indoor garbage can. However, in certain instances, recyclable materials cannot be inserted into a garbage can for a number of reasons, for instance because local rules prohibit use of garbage bags for recyclable materials. Thus, inclusion of a pad 14 can be beneficial to absorb any liquids coming from the recyclable materials, as well as providing other benefits such as minimizing growth and spread of bacteria, viruses, and germs, minimizing odors, and the like. Where a pad 14 is used with a can used for recyclable materials, the pad 14 may be manufactured from a recyclable material, which would enable the pad to be disposed of with the recyclable materials contained therein.

Figure 3:
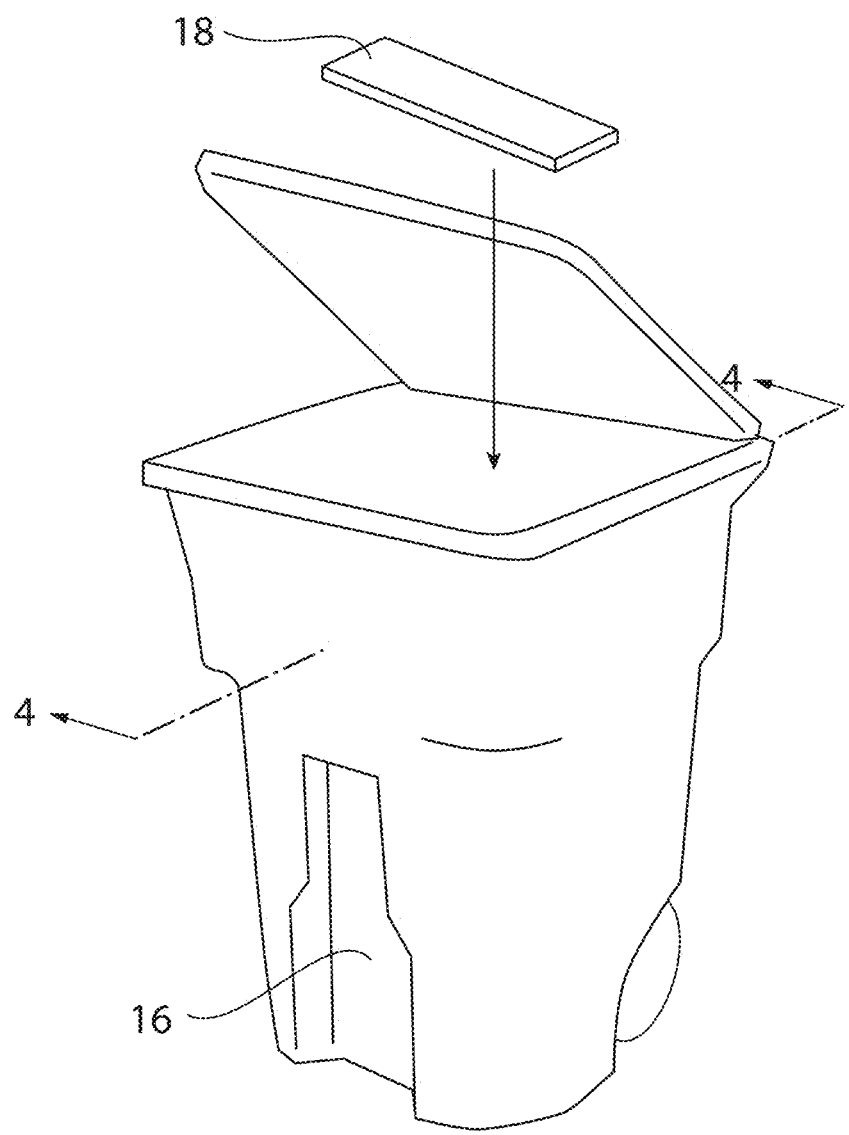
FIG. 3 illustrates an outdoor garbage can with an inventive disposable pad.
Figure 4:
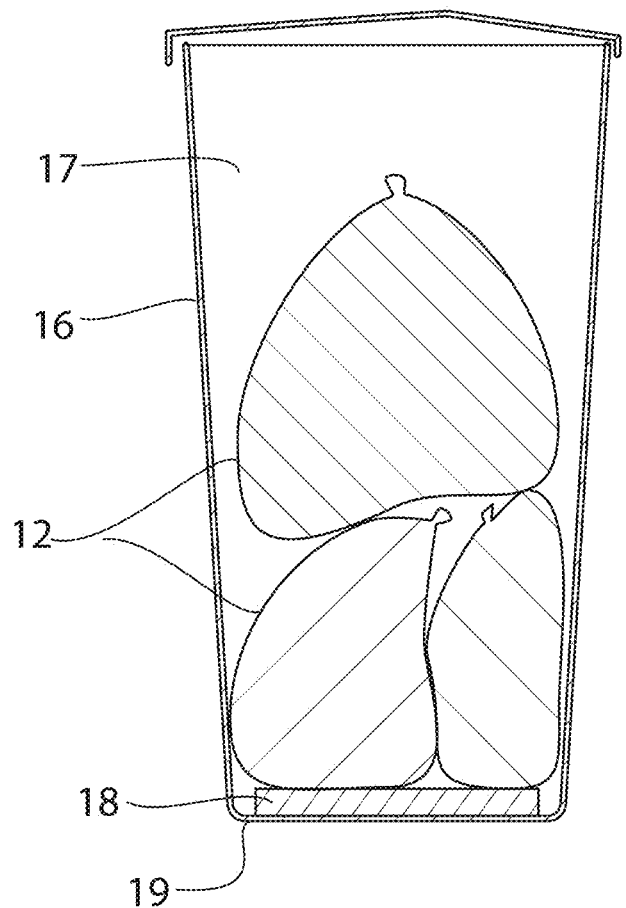
FIG. 4 illustrates a cross sectional view of an outdoor garbage can with an inventive disposable pad.
Figure 5:
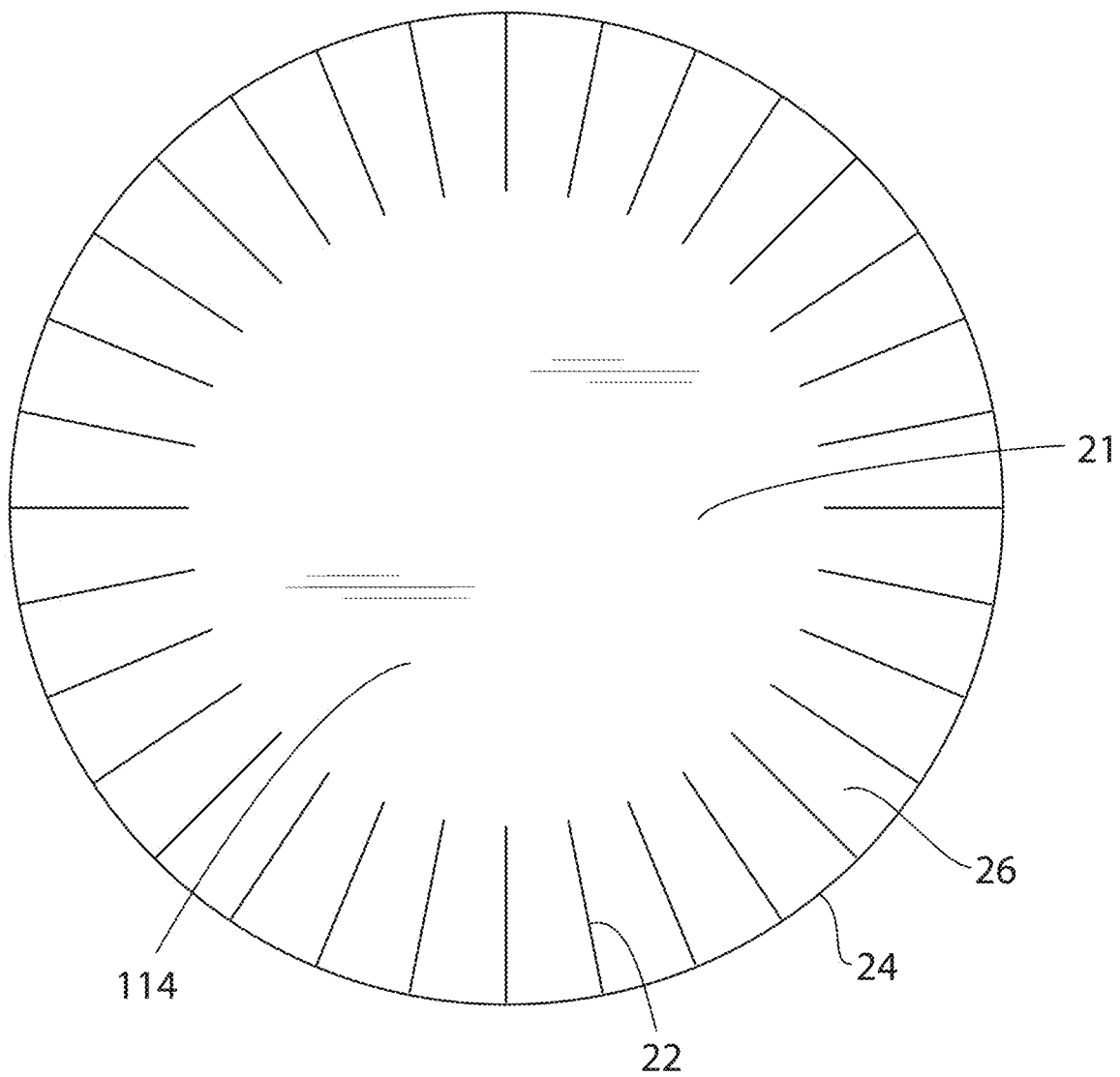
FIG. 5 is a top plan view of an inventive disposable pad.
Figure 6:
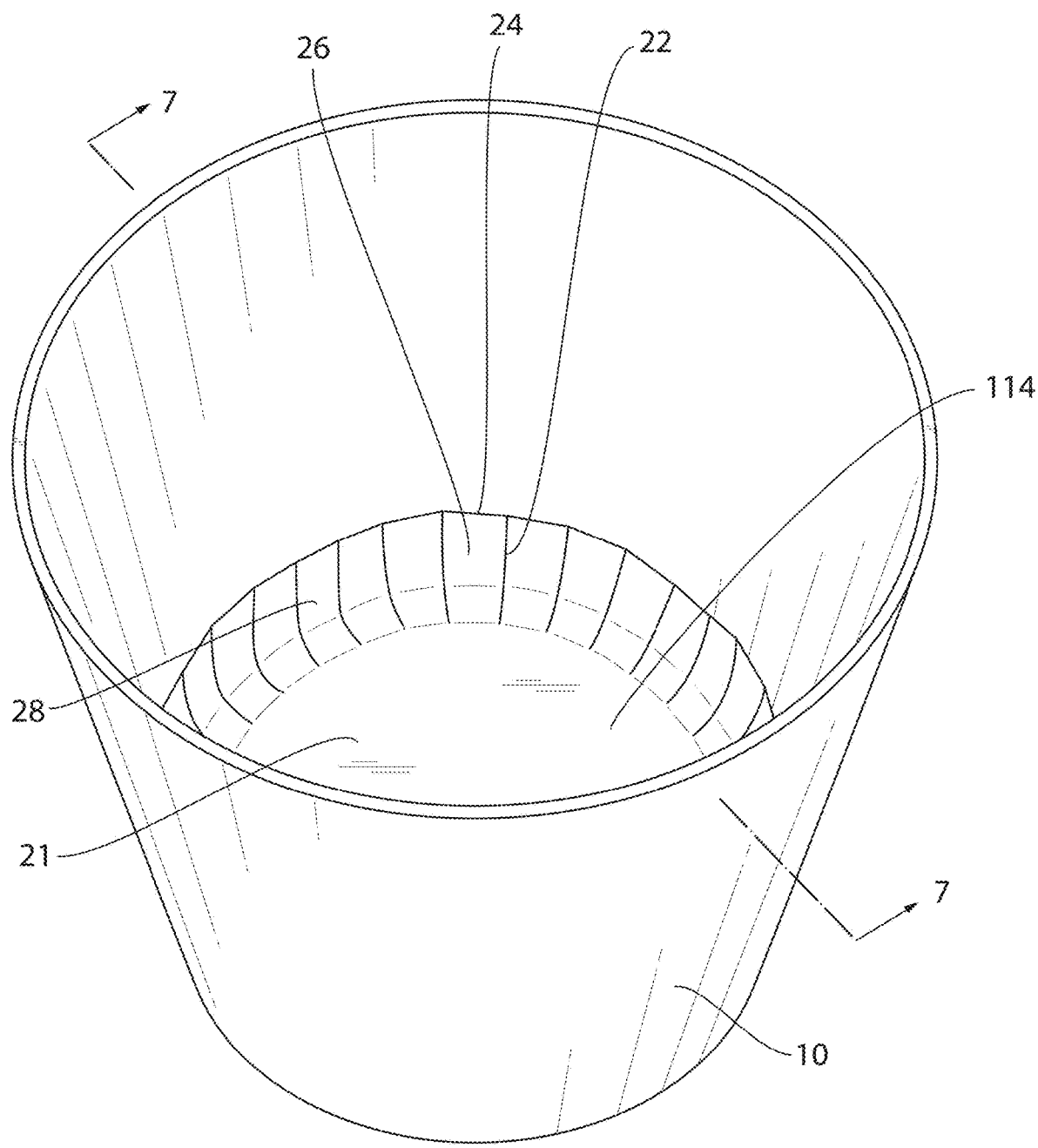
FIG. 6 is an isometric perspective view of the inventive disposable pad of FIG. 5 once it is inserted into a garbage can.
Figure 7:
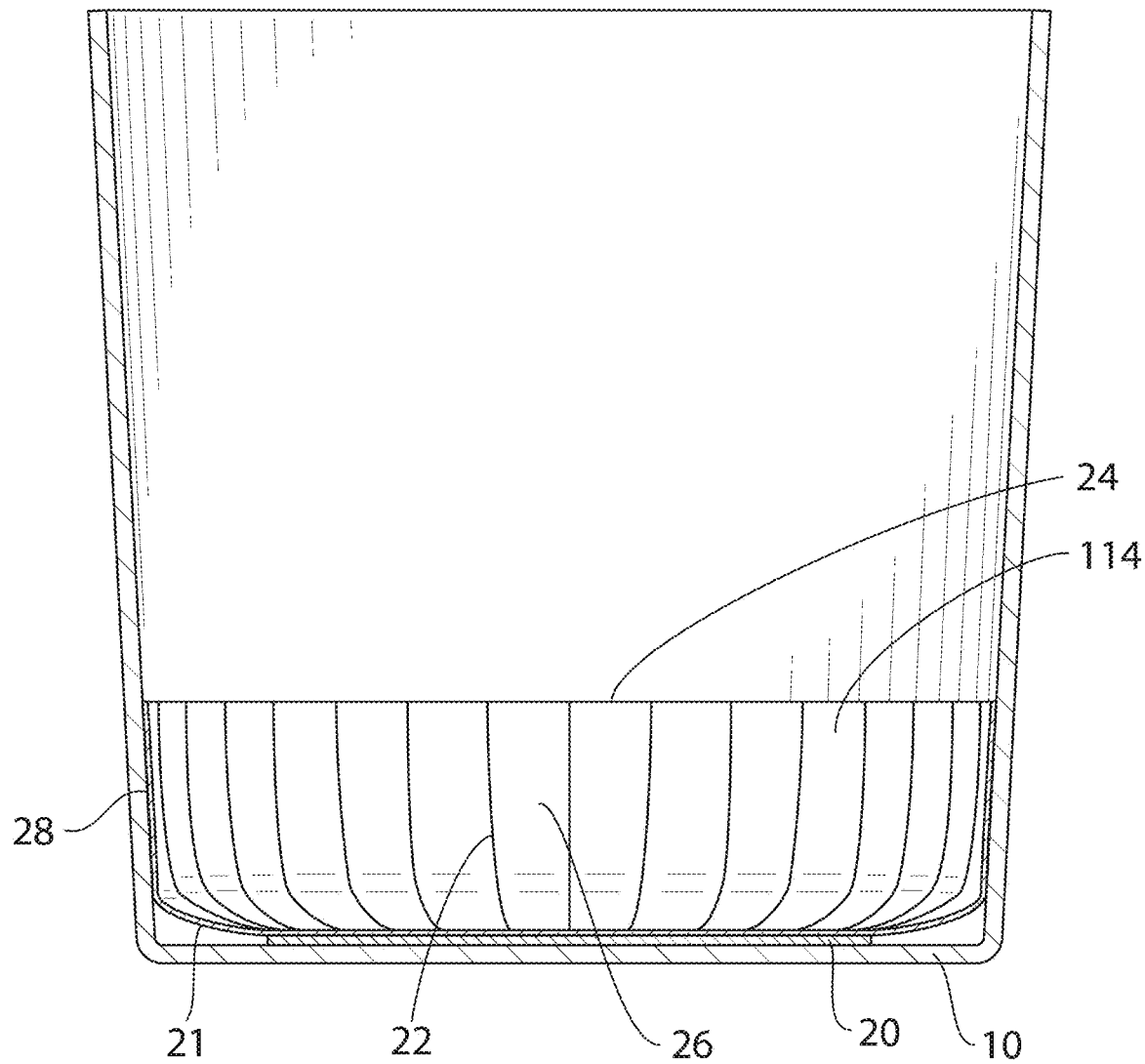
FIG. 7 is a sectional view of the garbage can and disposable pad of FIG. 6 taken about line 7-7 of FIG. 6.
Figure 8:
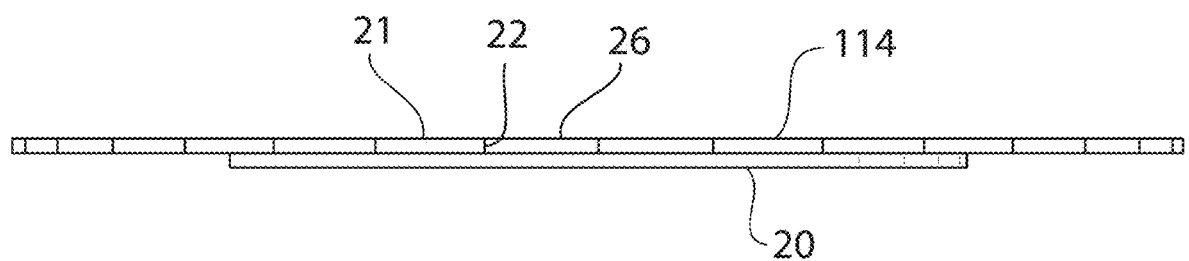
FIG. 8 is a side elevation view of the disposable pad of FIGS. 6 and 7.

In contrast, many outdoor garbage cans 16, particularly at home residences, such as what is shown in FIGS. 3 and 4, do not have individual bags attached thereto. Rather, bags from indoor garbage cans 10 are deposited within the outdoor garbage can 16 until a waste removal company comes and retrieves the garbage bags, typically on a weekly basis. Thus, outdoor garbage cans 16 usually have a significantly larger volume so that they can receive multiple bags 12 that are collected over the course of a week. The same can be said for outdoor cans used for recyclable materials. The pad 18 or other material for the outdoor garbage can 16 be larger to accommodate the larger footprint of the can 16 as seen in FIG. 4. Like the pad 14, the pad 18 is inserted into the interior 17 of the can 16 so it rests upon the bottom or base 19. Additionally, the various pads can be made of the same cardboard, paper, foam, or other material, but cut into different shapes depending on the size of the can it will be used with.

Further still, some individuals use compost bins to allow compostable materials, including leftover remains of fruits, vegetables, food, coffee grounds, paper, egg shells, and other products to decompose naturally. In many instances, such users have a large outdoor compost bin that remains on their property. In other instances, users pay a third party to routinely pick up their compostable materials, for instance using another can akin to an outdoor garbage can or recyclables can that are dumped into a vehicle. Typically, users have a small interior bin or container that is used to collect compostable materials during cooking, cleaning, and other indoor efforts, after which the bin or container is taken outside and dumped into an external compost bin. Because of the nature of compostable materials, residue, liquid, and the like can remain within the compost bin. Thus, a disposable pad akin to what is described above could similarly be used to absorb any such liquids or residue, while also minimizing growth and spread of bacteria, viruses, and germs, minimizing odors. Of course, such a pad may be made of a compostable material.

In one preferred embodiment, the pads 14, 18 are made of a meltblown fabric. Meltblown fabrics are made using a melt-blowing process which melts down polypropylene resin and blows the melted polymer into continuously and randomly laid fibers. Meltblown fabrics maintain their strength even when they become wet. This makes meltblown fabrics well suited for the present invention, where the pads 14, 18 will have a solution applied thereto, and where the pads 14, 18 will routinely get wet from the contents of the various cans 10, 16. Additionally, meltblown fabrics offer superior absorbable qualities. For instance, meltblown fabrics are capable of absorbing up to twelve times the dry weight of the meltblown fabric pad. Further still, meltblown fabrics have a high BTU value for potential incineration. Also, meltblown fabrics can soak up a variety of different materials without breaking down or having other adverse reactions, including for most hazmat, acidic, or caustic spill materials.

Furthermore, outdoor garbage cans 16 oftentimes receive other undesirable materials that users would never want in their home, including pet waste, chemicals, and the like. In contrast, many indoor garbage cans 10 are reserved only for certain materials, including food waste, tissues, napkins, and other cleaning materials. As a result, a pad 14 for use with an indoor garbage can 10 does not necessarily have the same requirements as a pad 18 for use with an outdoor garbage can 16.

As described above, the pad could also be made of other materials depending on the use of the pad. For instance, when used with cans or other containers containing recyclable materials, the pad could also be made of a recyclable material. This would enable the pad to be disposed of along with the recyclable materials. When used with cans or other containers containing compostable materials, the pad could also be made of a compostable material. This would enable the pad to be disposed of along with the compostable materials.

Furthermore, a solution that is applied to the pad 14, 18 can vary depending on whether it will be used with an indoor garbage can 10 rather than an outdoor garbage can 16, or recyclable cans or compost cans. More specifically, the solution applied to a pad 14 for an indoor garbage can 10 can be a weaker solution, whereas the solution applied to a pad 18 for an outdoor garbage can 16 can be a stronger solution. When used with a compost can or container, a weaker solution could be used to prevent adverse effects to the compostable material.

Additionally, pads 14, 18 having different solutions may be available depending on the specific desires of a consumer. If the primary concern is to prevent growth of bacteria and thus to improve sanitary conditions within the can, a first solution can be used. If reduction of odors from within the can is the primary concern, a second solution including a deodorizer can be used. Additionally or alternatively, the solution may be scented so as to help overcome unappealing smells. For instance, a specific solution may be used on pads 18 used with outdoor garbage cans 16 to deodorize food waste where the can 16 is located in areas where wild animals may be prevalent that open cans for leftover food waste. If concerns for both bacteria and odor apply, a third solution can be used. A separate solution can be used for outdoor garbage cans 16 owned by pet owners who deposit animal waste bags directly into the can 16. Of course, solutions can also be used that address all of the above-mentioned concerns simultaneously. Additionally, a separate solution may be used for cans 10, 16 that routinely have large quantities of food waste, for instance, for use at restaurants. The solution may be configured such that it successfully addresses any of the issues outlined above, while also being safe for a human to contact. As such, a human can pick up the pad and deposit it into the garbage can without being exposed to harmful chemicals or wearing gloves. Additionally, a human can hold the pad and cut it if a different size is desired so that it ideally fits within the can 10, 16.

In one preferred embodiment, the solution used for the pads 14, 18 is MY-SHIELD® Multi-Purpose, One Step Broad Spectrum Disinfectant Cleaner/Virucidal/Deodorizer. Exhibits A and B are attached here are hereby expressly incorporated by reference into the present application. This solution may include Alkyl Dimethyl Benzyl Ammonium Chloride, Octyl Decyl Dimethyl Ammonium Chloride, Dioctyl Dimethyl Ammonium Chloride, Didecyl Dimethyl Ammonium Chloride, Poly(hexamethylenebiguanide) hydrochloride, (3-Trimethoxysilyl) Propyl dimethyloctadecyl ammonium chloride, and other ingredients. While the Exhibits disclose specific proportions of the active ingredients, these proportions can be altered depending on the results a given user desires for the inventive pads 14, 18 once the solution has been applied.

Further, different pads 14, 18 can be used depending on the garbage can 10, 16 in which it will be used. For instance, for garbage cans 10, 16 having a significant risk of accumulation of moisture, a thicker, more absorbent pad 14, 18 may be used. Additionally, pads 14, 18 may be selected based on the size and shape of the garbage can 10, 16. For instance, the pad 14, 18 may be configured to fit securely within the can 10, 16 as seen in FIGS. 2 and 4. More specifically, the pad 14, 18 may come in the size and shape of the footprint of traditional garbage can sizes, including substantially square pads, substantially rectangular pads, substantially circular pads, substantially oval-shaped pads, and the like. In this way, the pad 14, 18 may be configured to cover the entire bottom or base 15, 19 of the garbage can 10, 16 in order to prevent materials from getting beneath the pad 14, 18. Thus, the pad 14, 18 can serve as a protective liner to the interior 13, 17 of the garbage can 10, 16. Further still, as discussed above, the different pads 14, 18 may be optimized to absorb water-based liquids, oil-based liquids, or a combination of both water-based and oil-based liquids. For instance, in certain instances, a pad 14 for an interior garbage can 10 may be optimized to absorb water-based liquids because oftentimes oil-based liquids are not deposited into an interior garbage can 10. To the contrary, particularly for a pad 18 configured for outdoor garbage cans 16, it may be important for the pad 18 to be optimized to absorb oil-based and water-based liquids, or simply oil-based liquids.

Figure 9:
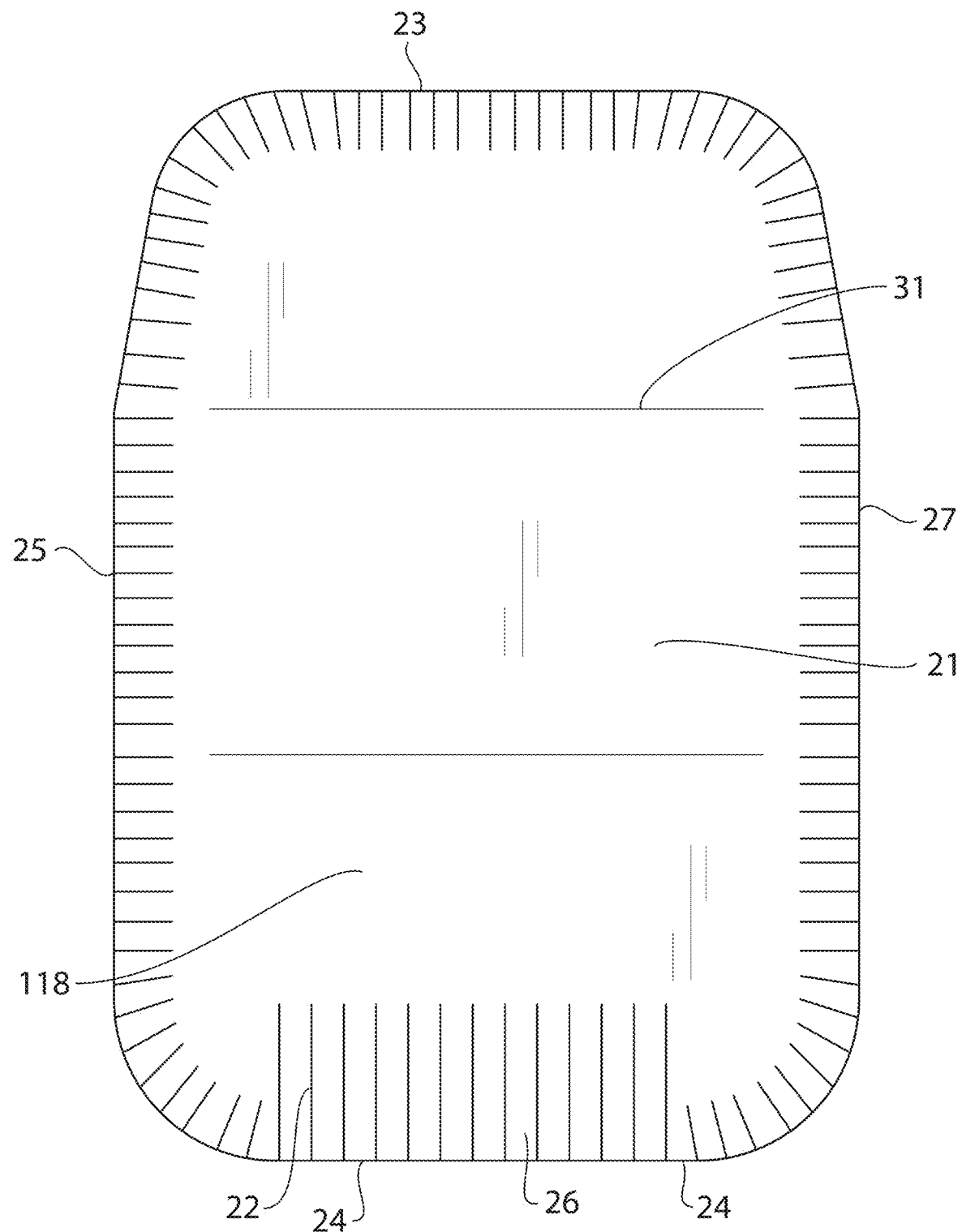
FIG. 9 is a top plan view of an inventive disposable pad.
Figure 10:
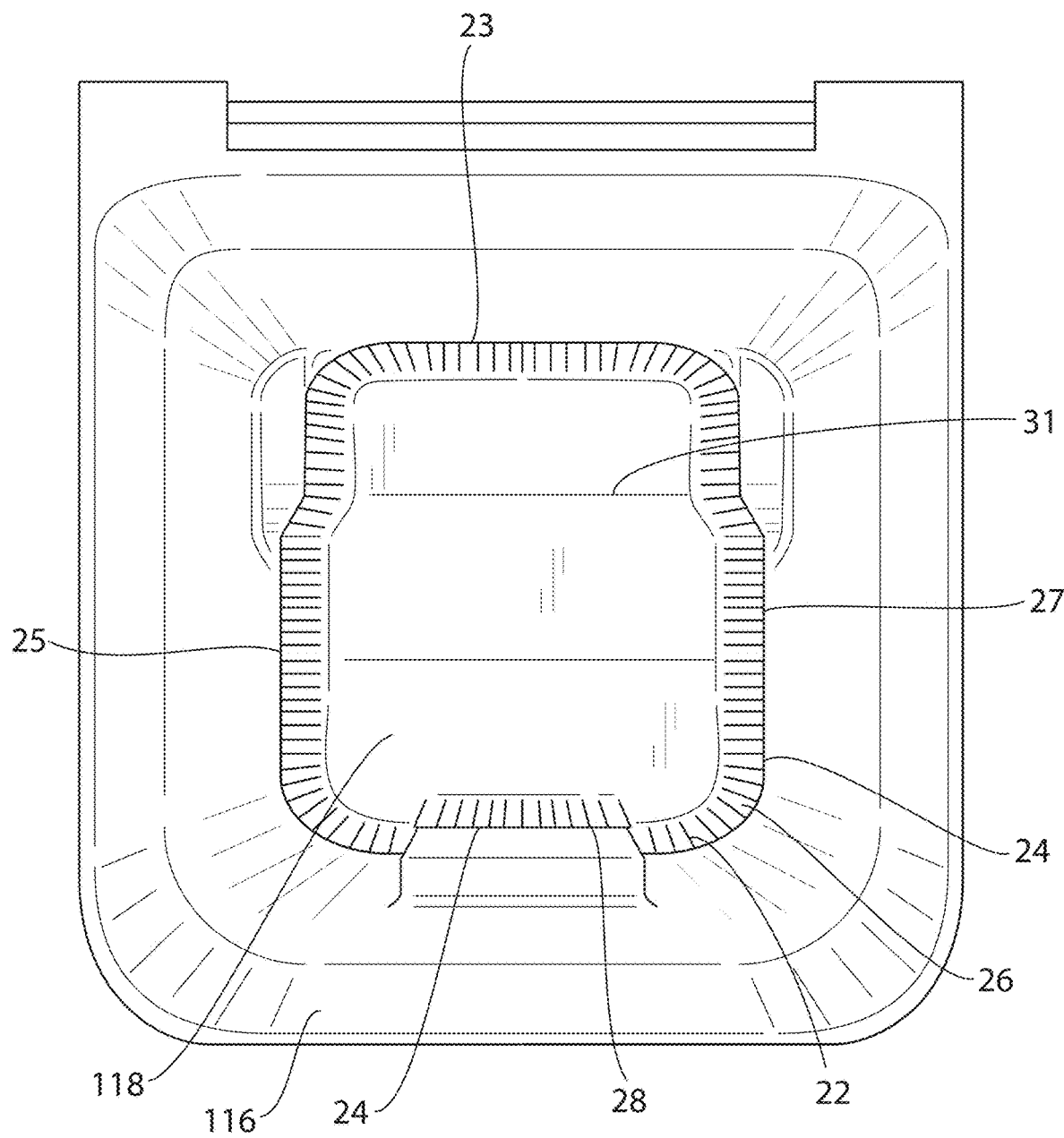
FIG. 10 is a top plan view of the disposable pad of FIG. 9 inserted into a garbage can.

Alternative pad designs are shown in FIGS. 5-10. It should be noted that elements in FIGS. 5-10 correspond to the same elements in FIGS. 1-4, incremented by 100. A repeated description of these features has been abbreviated or omitted for conciseness. As shown, the pads 114, 118 include a main pad body 21 having an outer edge 24, as well as a backing 20 that provides added structural rigidity to the main pad body 21. The backing 20 may be made of a rigid or semi-rigid material. More specifically, as shown, the backing 20 is a card stock material that mounts to the underside of the pad 114, 118, although any other desired material including plastic, paper, and the like could similarly be used. Additionally, the backing 20 may be shaped and dimensioned to have a footprint that substantially conforms to the footprint of the respective garbage can 110, 116. This added structural rigidity makes it easier for insertion and proper location within the garbage can 110, 116. Additionally, in certain embodiment one or more folds 31 may be formed in the backing 20 to help ensure the pad 114, 118 securely fits and conforms to the shape of the garbage can 110, 116. For instance, as seen in FIGS. 9 and 10, two folds 31 are formed in the backing that enable to pad 118 to conform to two different slope changes in the bottom of the garbage can 116.

Additionally, the backing 20 helps ensure the pad 114, 118 extends to the edge of the garbage can 110, 116, while also helping prevent the pad 114, 118 from sticking to the bottom of the garbage can 110, 116. In certain embodiments, such as FIGS. 7 and 8, the backing 20 is a single piece of card stock. In other embodiments, such as FIGS. 9 and 10, multiple backings 20 may be included, or a single backing 20 may be used with grooves or other features formed therein, which helps the pads 114, 118 conform to the interior of a garbage can 110, 116 despite the garbage can 110, 116 having a somewhat unique footprint. Of course, multiple sheets of backing 20 could similarly be utilized to help ensure the pad 114, 118 is properly oriented in the garbage can 110, 116.

Additionally, the pads 114, 118 may include a plurality of slits 22 extending inwardly from an outer edge 24. More specifically, as shown the plurality of slits 22 form a plurality of fringes 26 around the outer edge 24 of the pad 114, 118. In certain embodiments, the slits 22 are formed around the entire perimeter of the pad 114, 118, while in other embodiments, the slits are 22 only formed around certain portions of the pad 114, 118. These fringes 26 allow the outer edge 24 of the pad 114, 118 to better fit within the garbage can 110, 116. More specifically, when the pad 114, 118 is inserted into the garbage can 110, 116, the fringes 26 move upwardly and overlap to create an outer perimeter 28. This outer perimeter 28 is particularly helpful in forming a well-fitting pad 114, 118 having a protective liner, while also preventing food, liquids, and other debris from escaping outside of the pad 114, 118 and within the bottom of the garbage can 110, 116. As shown in the embodiment in FIGS. 5-8, the pad 114 is substantially circular, with each slit 22 being substantially the same length and substantially equidistantly spaced about the perimeter of the pad 114. Alternatively, in the embodiment shown in FIGS. 9 and 10, the slits 22 may have different lengths and orientations. For instance, as shown, the slits 22 along a top edge 23, first and second side edges 25, 27, and a portion of the bottom edge 29 are substantially the same length and equidistant relative to one another. However, slits 22 formed along the remainder of the bottom edge 29 are longer in length, which helps to facilitate an outdoor garbage can 116 having a cut out located along that edge. Of course, different slit 22 configurations may be provided to ensure secure location of the pad within the can.

Exemplary dimensions of the inventive pads 114, 118 having backings 20 having sufficient coverage of common garbage can 110, 116 configurations will now be described in relation to FIGS. 11A-11E.

Figure 11A:
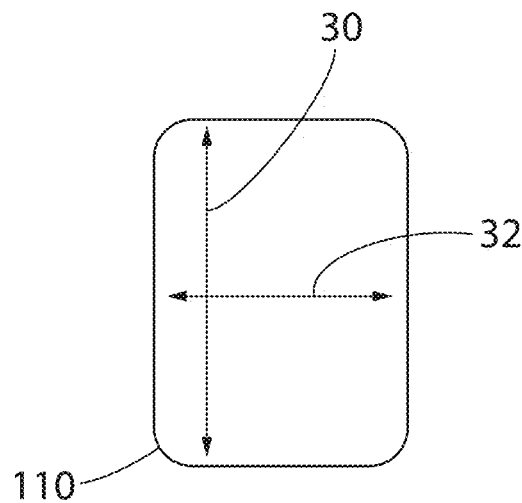
FIGS. 11A-11E are top plan views of potential garbage cans and associated inventive disposable pads for the purposes of identifying exemplary dimensions.

Initially, pads 114 associated with generally rectangular indoor garbage cans 110 will be described in connection to FIG. 11A. The can 110 and illustrated pad 114 do have slightly rounded corners. Dimensions of the inventive pad and backing will be described relative to a length identified by reference line 30 and a width identified by reference line 32.

A pad 114 configured for a large generally rectangular indoor garbage can 110 may include a backing 20 having a length of approximately 14.75-18-75 inches, and more preferably a length of approximately 16.75 inches and a width of approximately 7.25-11.25 inches, and more preferably a width of approximately 9.25 inches, Such a pad 114 for a large generally rectangular indoor garbage can 110 may feature a length of approximately 21.5-25.5 inches, and more preferably a length of approximately 23.5 inches and a width of approximately 13-17 inches, and more preferably a width of approximately 15 inches.

A pad 114 configured for a medium generally rectangular indoor garbage can 110 may include a backing 20 having a length of approximately 11.25-15.25 inches, and more preferably a length of approximately 13.25 inches and a width of approximately 4.75-8.75 inches, and more preferably a width of approximately 6.75 inches, Such a pad 114 for a medium generally rectangular indoor garbage can 110 may feature a length of approximately 17-21 inches, and more preferably a length of approximately 19 inches and a width of approximately 10.5-14.5 inches, and more preferably a width of approximately 12.5 inches.

A pad 114 configured for a small generally rectangular indoor garbage can 110 may include a backing 20 having a length of approximately 7.75-11.75 inches, and more preferably a length of approximately 9.75 inches and a width of approximately 3.25-7.25 inches, and more preferably a width of approximately 5.25 inches, Such a pad 114 for a small generally rectangular indoor garbage can 110 may feature a length of approximately 12.5-16.5 inches, and more preferably a length of approximately 14.5 inches and a width of approximately 9.5-13.5 inches, and more preferably a width of approximately 11.5 inches.

A pad 114 configured for an extra small generally rectangular indoor garbage can 110 may include a backing 20 having a length of approximately 4.75-8.75 inches, and more preferably a length of approximately 6.75 inches and a width of approximately 2-6 inches, and more preferably a width of approximately 4 inches, Such a pad 114 for an extra small generally rectangular indoor garbage can 110 may feature a length of approximately 9.5-13.5 inches, and more preferably a length of approximately 11.5 inches and a width of approximately 6.25-10.25 inches, and more preferably a width of approximately 8.25 inches.

A pad 114 configured for an extra large generally rectangular indoor garbage can 110 may include a backing 20 having a length of approximately 19.25-23.25 inches, and more preferably a length of approximately 21.25 inches and a width of approximately 13.25-17.25 inches, and more preferably a width of approximately 15.25 inches, Such a pad 114 for an extra large generally rectangular indoor garbage can 110 may feature a length of approximately 21.5-25.5 inches, and more preferably a length of approximately 23.5 inches and a width of approximately 15.5-19.5 inches, and more preferably a width of approximately 17.5 inches.

Figure 11B:
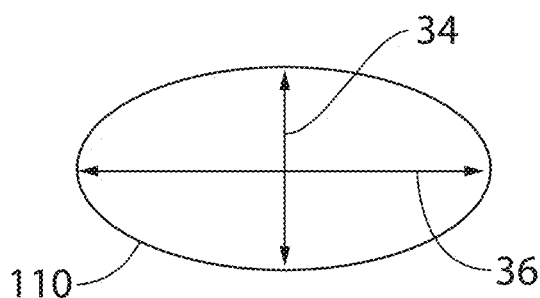

Next, pads 114 associated with generally oval indoor garbage cans 110 will be described in connection to FIG. 11B. Dimensions of the inventive pad and backing will be described relative to a length identified by reference line 34 and a width identified by reference line 36.

A pad 114 configured for a medium generally oval indoor garbage can 110 may include a backing 20 having a width of approximately 7-11 inches, and more preferably a width of approximately 9 inches and a length of approximately 3.75-7.75 inches, and more preferably a length of approximately 5.75 inches, Such a pad 114 for a medium generally oval indoor garbage can 110 may feature a width of approximately 11.75-15.75 inches, and more preferably a width of approximately 13.75 inches and a length of approximately 8.75-12.75 inches, and more preferably a length of approximately 10.75 inches.

A pad 114 configured for a small generally oval indoor garbage can 110 may include a backing 20 having a width of approximately 3.75-7.75 inches, and more preferably a width of approximately 5.75 inches and a length of approximately 1.75-5.75 inches, and more preferably a length of approximately 3.75 inches, Such a pad 114 for a small generally oval indoor garbage can 110 may feature a width of approximately 9-13 inches, and more preferably a width of approximately 11 inches and a length of approximately 5.75-9.75 inches, and more preferably a length of approximately 7.75 inches.

Figure 11C:
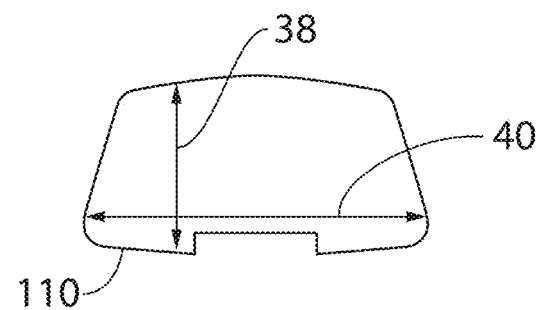

Next, pads 114 associated with semi circular indoor garbage cans 110 will be described in connection to FIG. 11C. Dimensions of the inventive pad and backing will be described relative to a length identified by reference line 38 and a width identified by reference line 40.

A pad 114 configured for a large semi-circular indoor garbage can 110 may include a backing 20 having a width of approximately 20.25-24.25 inches, and more preferably a width of approximately 22.25 inches and a length of approximately 8.25-12.25 inches, and more preferably a length of approximately 10.25 inches, Such a pad 114 for a large semi-circular indoor garbage can 110 may feature a width of approximately 22.5-26.5 inches, and more preferably a width of approximately 24.5 inches and a length of approximately 10.5-14.5 inches, and more preferably a length of approximately 12.5 inches.

A pad 114 configured for a medium semi-circular indoor garbage can 110 may include a backing 20 having a width of approximately 12.75-16.75 inches, and more preferably a width of approximately 14.75 inches and a length of approximately 4.25-8.25 inches, and more preferably a length of approximately 6.25 inches, Such a pad 114 for a medium semi-circular indoor garbage can 110 may feature a width of approximately 18-22 inches, and more preferably a width of approximately 20 inches and a length of approximately 10-14 inches, and more preferably a length of approximately 12 inches.

A pad 114 configured for a small semi-circular indoor garbage can 110 may include a backing 20 having a width of approximately 9.75-13.75 inches, and more preferably a width of approximately 11.75 inches and a length of approximately 3.25-7.25 inches, and more preferably a length of approximately 5.25 inches, Such a pad 114 for a small semi-circular indoor garbage can 110 may feature a width of approximately 14.5-18.5 inches, and more preferably a width of approximately 16.5 inches and a length of approximately 8-12 inches, and more preferably a length of approximately 10 inches.

A pad 114 configured for an extra small semi-circular indoor garbage can 110 may include a backing 20 having a width of approximately 5-9 inches, and more preferably a width of approximately 7 inches and a length of approximately 1.75-5.75 inches, and more preferably a length of approximately 3.75 inches, Such a pad 114 for a small semi-circular indoor garbage can 110 may feature a width of approximately 10-14 inches, and more preferably a width of approximately 12 inches and a length of approximately 5.5-9.5 inches, and more preferably a length of approximately 7.5 inches.

Figure 11D:
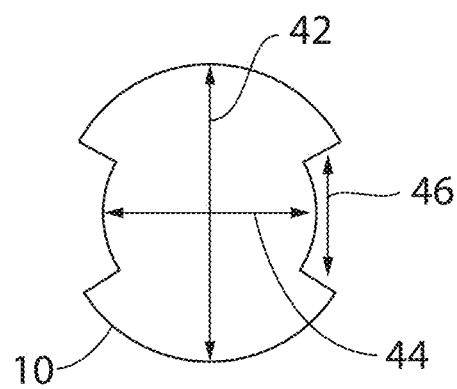

Next, pads associated with a large generally circular indoor garbage cans 110 will be described in connection to FIG. 11D. Dimensions of the inventive pad and backing will be described relative to a length identified by reference line 42, a width identified by reference line 44, and notches are included that are identified by reference line 46 for a large circular garbage can 110. A pad 114 configured for a large circular indoor garbage can 110 may include a backing 20 having a width of approximately 8.75-12.75 inches, and more preferably a width of approximately 10.75 inches, a length of approximately 14.25-18.25 inches, and more preferably a length of approximately 16.25 inches, and notches having dimensions of approximately 3.25-7.25 inches, and more preferably notches of approximately 5.25 inches, Such a pad 114 for a large circular indoor garbage can 110 may feature a diameter of approximately 20.5-24.5 inches, and more preferably a diameter of approximately 22.5 inches.

Figure 11E:
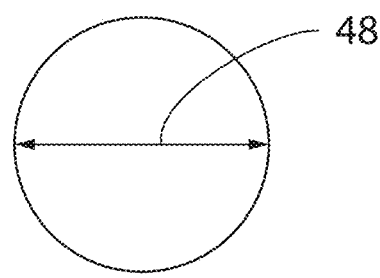

Pads associated with other smaller generally circular indoor garbage cans 110 have an inventive pad and backing having a diameter identified by reference line 48 as shown in FIG. 11E. For instance, for a medium circular indoor garbage can 110, the diameter of the backing 20 is approximately 10.25-14.25 inches, and more preferably approximately 12.25 inches, with the pad 114 having a diameter of approximately 16-20 inches, and more preferably approximately 18 inches. For a small circular indoor garbage can 110, the diameter of the backing 20 is approximately 6.25-10.25 inches, and more preferably approximately 8.25 inches, with the pad 114 having a diameter of approximately 12-16 inches, and more preferably approximately 14 inches. For an extra small circular indoor garbage can 110, the diameter of the backing 20 is approximately 2.25-6.25 inches, and more preferably approximately 4.25 inches, with the pad 114 having a diameter of approximately 7.75-11.75 inches, and more preferably approximately 9.75 inches. For an extra large circular indoor garbage can 110, the diameter of the backing 20 is approximately 18.75-22.75 inches, and more preferably approximately 20.75 inches, with the pad 114 having a diameter of approximately 26-30 inches, and more preferably approximately 28 inches. Greater variations in the dimensions may be present, for instance, with larger outdoor garbage cans including those on wheels. For instance, the dimensions may vary by a magnitude of approximately +/−10 inches relative to the interior dimensions of the garbage can.

Additionally, the present invention may come in a convenient package for ongoing use. For instance, a pack may be provided that contains a set amount of pads. For instance, the pack may include four pads, such that a user can use one pad per week for one month. Similarly, the pack may include a dozen pads, which could be sufficient for a three-month supply of pads where the pads are disposed on a weekly basis, although some pads may be kept for multiple weeks. Further, the pack may include a six-month supply of pads. Further still, the pack may include a one-year supply of pads. Of course, the pads could also be sold individually, otherwise they can be sold in any desired quantity to improve ease of use. The pack may also include multiple types of pads, for instance a first set of pads for an indoor garbage can or cans, and a second set of pads for an outdoor can or cans. Additionally, the pack may include a mount to enable the pack to the be secured on or in close proximity to the designated garbage can. Alternatively still, the pack may come with pads and the solution in a bottle such that a user can apply the solution to the pad. Also, the pad and/or the pack may come equipped with various text and graphics to help users understand the purpose and characteristics of the pad and/or the pack. For instance, a logo, slogan, and/or instructions may be printed or otherwise affixed to the pad and/or the pack.

While the above description provides a number of potential uses of the pad, it should be noted that there are virtually innumerable uses for the present invention, all of which need not be detailed here. For instance, although the pads are described for use with garbage cans, they could similarly be used with other types of containers and devices. All the disclosed embodiments can be practiced without undue experimentation.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept. In addition, the individual components need not be fabricated from the disclosed materials, but could be fabricated from virtually any suitable materials.

Moreover, the individual components need not be formed in the disclosed shapes, or assembled in the disclosed configuration, but could be provided in virtually any shape, and assembled in virtually any configuration to improve the efficiency and functionality of the pads. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

What is claimed is:

1. A sanitization product for a container having one or more garbage bags, recyclable materials, and compostable materials located therein comprising:

a disposable pad configured to be deposited into the interior of the container beneath the one or more garbage bags, recyclable materials, and compostable materials; and a solution applied to the disposable pad configured to kill at least one of bacteria, germs, microorganisms, and viruses.

2. The sanitization product for a container of claim 1, wherein the disposable pad further comprises:
a main pad body having an outer edge;
a plurality of slits extending inwardly from the outer edge; and
a plurality of fringes formed between adjacent slits.

3. The sanitization product for a container of claim 2, wherein the plurality of fringes overlap to form an outer perimeter when the disposable pad is inserted into the interior of the container.

4. The sanitization product for a container of claim 3, wherein the outer perimeter provides a protective liner for the bottom of the container.

5. The sanitization product for a container of claim 2, wherein the plurality of slits are formed substantially equidistantly around the outer edge.

6. The sanitization product for a container of claim 2, wherein the plurality of slits comprises:
a first plurality of slits extending substantially the same first distance inwardly from a first portion of the outer edge; and
a second plurality of slits extending substantially the same second distance inwardly from a second portion of the outer edge;
wherein the first distance is greater than the second distance.

7. The sanitization product for a container of claim 1, further comprising a rigid or semi-rigid backing material affixed to the disposable pad.

8. The sanitization product for a container of claim 7, wherein the rigid or semi-rigid backing material further comprises one or more folds configured to enable the rigid or semi-rigid backing material to conform to a bottom or side surface of the container.

9. A method of using a sanitization product for a container having a bottom and at least one side comprising the steps of:
inserting a disposable pad into the container;
forming a protective perimeter within the container using the disposable pad;
inserting one or more of garbage, recyclable materials, and compostable materials into the container; and
disposing of the one or more of garbage, recyclable materials, and compostable materials and the disposable pad.

10. The method of claim 9, further comprising the step of moving a plurality of fringes formed in an outer edge of the disposable pad in an upward direction while the disposable pad is inserted into the container.

11. The method of claim 10, further comprising the step of forming an outer perimeter by the plurality of fringes when the disposable pad is inserted into the container.

12. The method of claim 11, wherein the outer perimeter abuts the at least one side of the container.

13. The method of claim 11, further comprising the step of containing liquids from the container within the outer perimeter.

14. The method of claim 9, further comprising the step of locating a backing attached to the disposable pad adjacent to the bottom.

15. The method of claim 14, wherein the backing provides structural rigidity to the disposable pad.

16. The method of claim 14, wherein the backing has a footprint that is compatible with a footprint of the container.

17. The method of claim 9, wherein the container is an indoor garbage can; and further comprising the steps of:
attaching a first garbage bag to the indoor garbage can where the pad is located beneath;
removing the first garbage bag once the first garbage bag is full;
attaching at least one additional garbage bag to the indoor garbage can where the pad is located beneath; and
disposing of the at least one additional garbage bag and the disposable pad.

18. The method of claim 9, wherein the container is an outdoor garbage can; and further comprising the steps of:
placing the disposable pad in the bottom of the outdoor garbage can;
placing at least one filled garbage bag on top of the disposable pad; and
disposing of the at least one filled garbage bag and the disposable pad.

19. A cleaning product for a container comprising:
a disposable pad configured to be deposited into the interior of the container comprising:
a main pad body having an outer edge;
a plurality of slits extending inwardly from the outer edge; and
a plurality of fringes formed between adjacent slits;
a rigid or semi-rigid backing mounted to the main pad body; and
a solution applied to the disposable pad configured to kill at least one of bacteria, germs, microorganisms, and viruses.

20. The sanitization product for a container of claim 19, wherein the plurality of fringes overlap to form an outer perimeter when the disposable pad is inserted into the interior of the container; and
wherein the outer perimeter provides a protective liner for the bottom of the container.

* * * * *